Aug. 10, 1943.            G. R. GREENSLADE            2,326,352
         METHOD AND APPARATUS FOR DETECTING PROGRESSIVE
                 FRACTURES OR THE LIKE IN HEAVILY
                      STRESSED WORKING MEMBERS
                        Filed Nov. 18, 1940            3 Sheets-Sheet 1
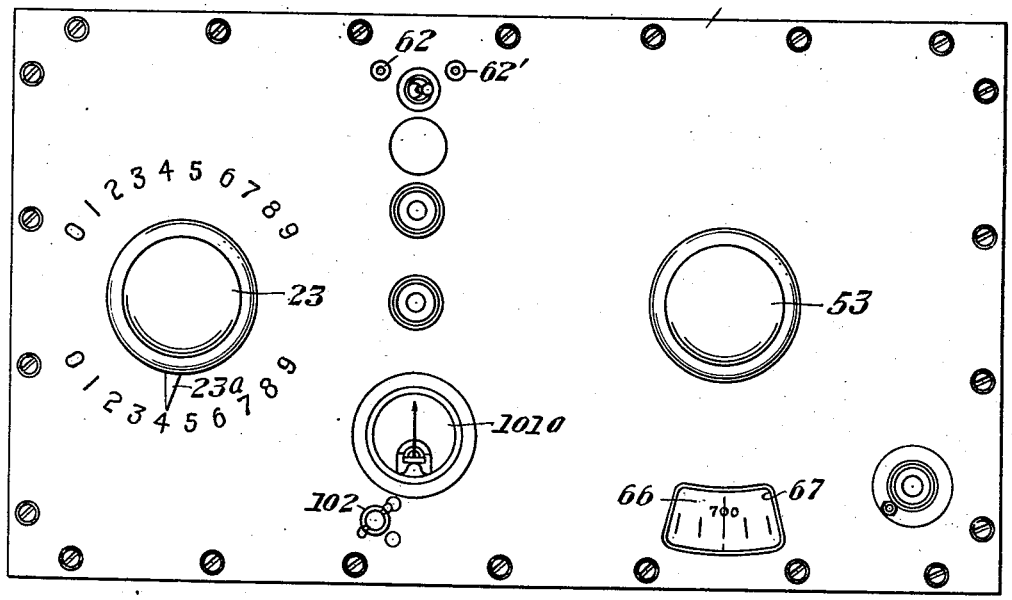
Fig.1.
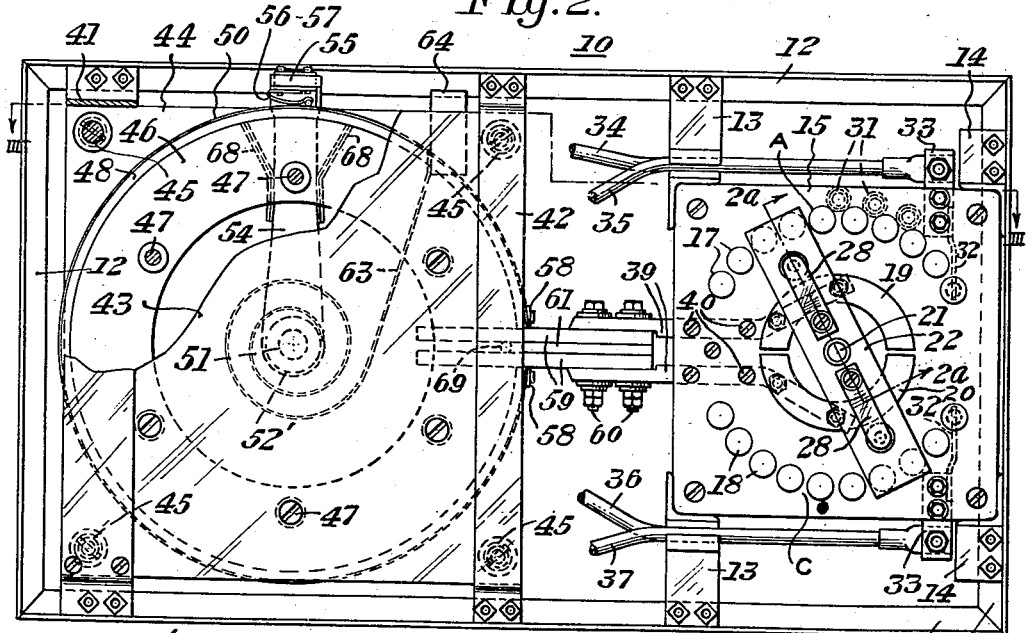
Fig.2.
Fig.2A.
INVENTOR
Grover R. Greenslade
by his attorneys
Stebbins and Blenko Aug. 10, 1943.                G. R. GREENSLADE                2,326,352
          METHOD AND APPARATUS FOR DETECTING PROGRESSIVE
                   FRACTURES OR THE LIKE IN HEAVILY
                        STRESSED WORKING MEMBERS
                   Filed Nov. 18, 1940           3 Sheets-Sheet 2
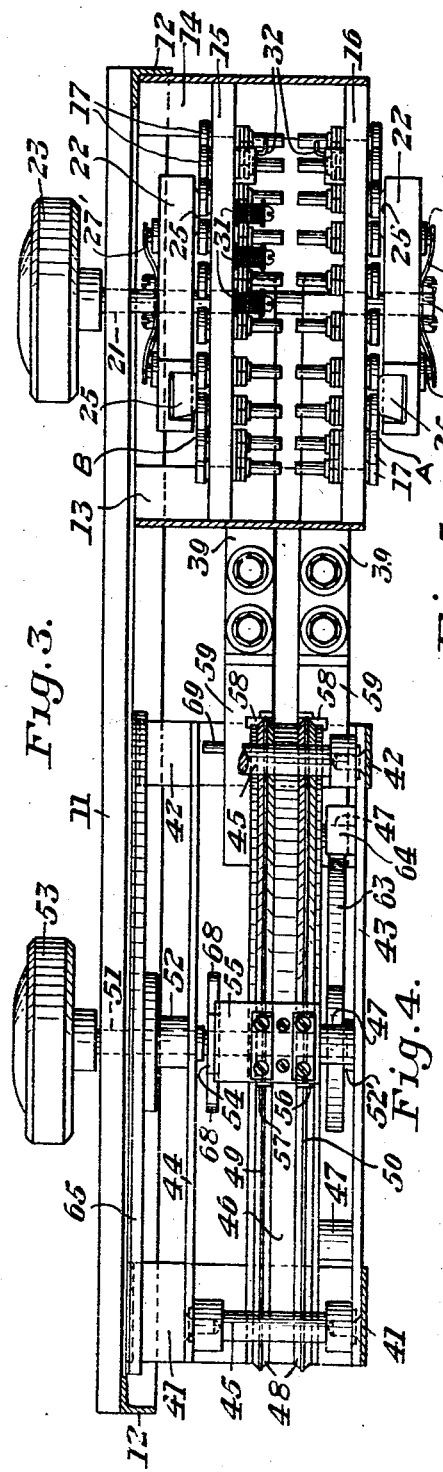
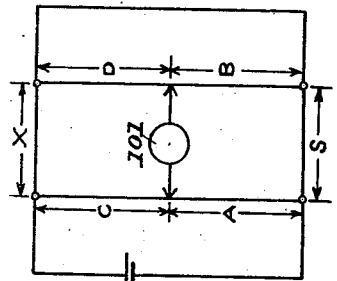
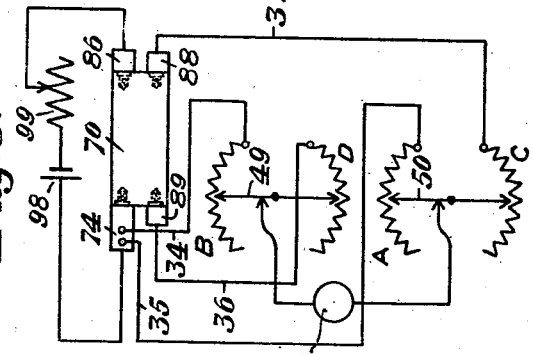
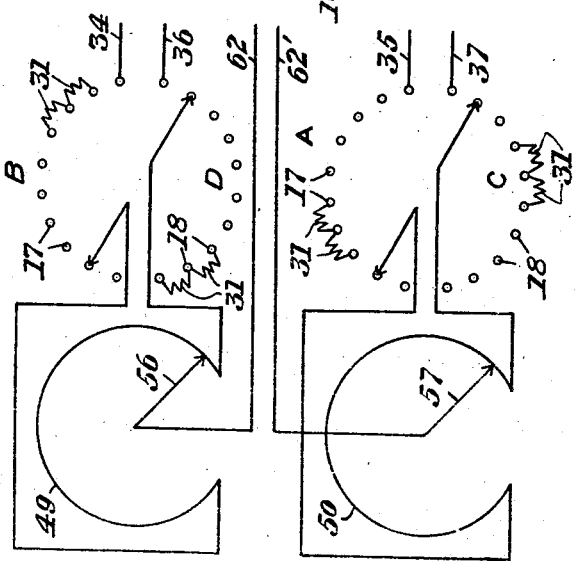
INVENTOR
Grover R. Greenslade
by his attorneys
Stebbins and Blenko

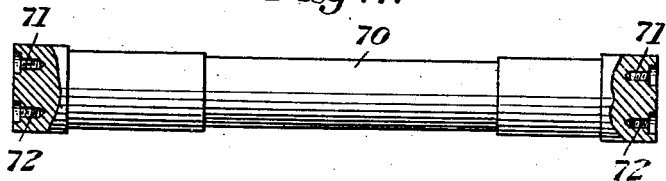
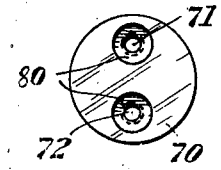
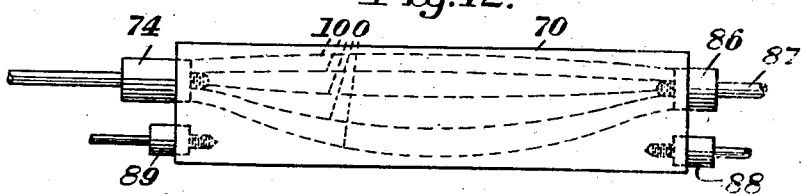
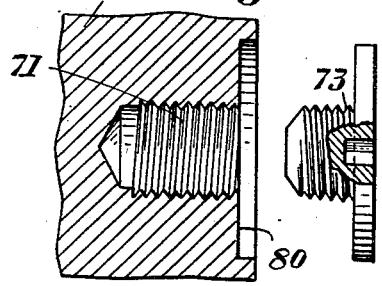
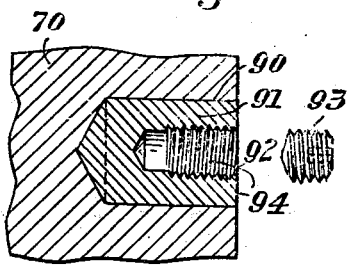
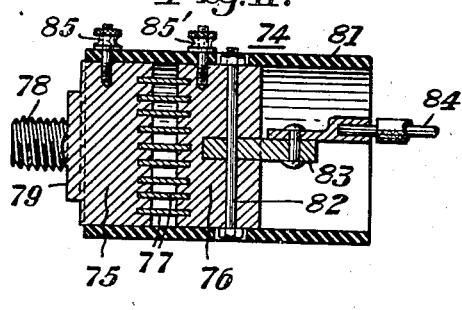
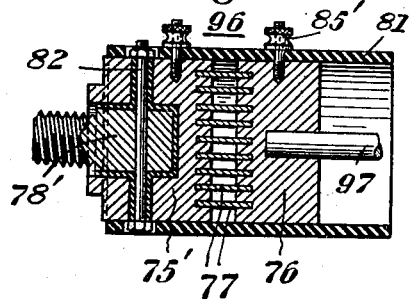
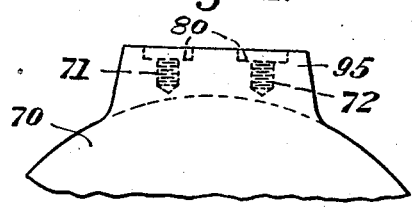
INVENTOR
Grover R. Greenslade
by his attorneys
Stebbins and Blenko Patented Aug. 10, 1943

2,326,352

UNITED STATES PATENT OFFICE 2,326,352

METHOD AND APPARATUS FOR DETECTING PROGRESSIVE FRACTURES OR THE LIKE IN HEAVILY STRESSED WORKING MEMBERS

Grover R. Greenslade, Scott Township, Allegheny County, Pa., assignor to Flannery Bolt Company, Bridgeville, Pa., a corporation of Delaware Application November 18, 1940, Serial No. 366,156

11 Claims. (Cl. 175—183)

This invention relates to the detection of changes in the physical condition of metal members normally subjected to relatively heavy stresses in order that the members may be replaced before defects therein reach such a condition as to constitute a hazard to the safe operation of the apparatus with which they are associated.

This is a continuation-in-part of my copending application Ser. No. 36,306, filed August 15, 1935.

Numerous metallic working members are subjected to very heavy stresses in normal service. A few examples are the axles, crank pins, connecting rods, and side rods of a conventional steam locomotive. It is practically impossible, furthermore, to detect flaws in such parts by visual inspection, despite the closest scrutiny, until they have progressed far beyond the point at which such members may be safely continued in service. One reason for this is that the most highly stressed portions of certain members such as axles and crank pins are entirely concealed, being within the wheels with which they are associated. These members, furthermore, cannot be removed from the wheels for inspection and then replaced.

I have discovered a novel method and apparatus for revealing structural changes in metallic working members such as permanent fatigue, the commencement of a fracture, or a combination of these or other defects which may develop under the periodic application of stress over long periods.

I have discovered that such changes in the physical condition of a working member are accompanied by changes in the resistance to the flow of electric current which may be measured with sufficient accuracy to make possible a significant interpretation thereof. I have also invented a novel procedure and apparatus operating on the principles of my discovery, whereby working members may be easily tested periodically while in service, under conditions such as to insure that observed changes in the electrical resistance of the member may be safely relied on as an index of the changing condition of the member.

In the preferred embodiment and practice of the invention, I provide portable apparatus, including the elements necessary to constitute a Kelvin double bridge, and a current source adapted to supply to the member under test, a current of sufficient magnitude for accurate treatment of the resistance. Since the accuracy of the Kelvin bridge depends on a connection of negligible resistance between the member whose resistance is to be determined and the known resistor with which it is to be compared, I have devised a novel form of known resistor having a connection for securing it to the part being tested, viz., a locomotive axle, said connection being characterized by an exceedingly low resistance and capable of being made and broken repeatedly without affecting said resistance.

Specifically, I provide current contact stations on the member to be tested and a known resistor adapted to be attached directly thereto and to have intimate mechanical and electrical contact therewith. By connections through these stations, I establish the current circulating through the known resistors and the member under test, which is necessary for a resistance measurement with the Kelvin double bridge.

Voltage contact stations are likewise provided on the member under test, whereby it may be connected with the double bridge circuit for the purpose of determining its resistance. The voltage contact stations are located far enough from the current contact stations to avoid the effect of the increased current density adjacent the latter, as compared with the density in other portions of the path of the current through the member being tested.

The invention also contemplates novel features in the construction and arrangement of the apparatus constituting the Kelvin double bridge, which will be pointed out in the course of the following detailed description and explanation, with reference to the accompanying drawings for an illustration of the preferred embodiment and practice. In the drawings:

Figure 1 is a front elevation of a portable testing unit embodying all necessary elements of a Kelvin double bridge, except a source of current, a standard resistor, and a sensitive galvanometer.

Figure 2 is a rear elevation with parts broken away;

Figure 2a is a partial sectional view taken substantially along the line 2a—2a of Figure 2;

Figure 3 is a sectional view taken along line III—III of Figure 2, with parts omitted or broken away for the sake of clearness;

Figure 4 is a wiring diagram of the apparatus shown in Figures 1 to 3;

Figure 5 is a complete circuit diagram showing the member being tested and all the elements of a Kelvin double-bridge circuit;

Figure 6 is a diagram showing the equivalent or simplified circuit corresponding to Figure 5;

Figure 7 is an elevation of a working member such as a locomotive axle, having current and voltage contact stations according to the invention;

Figure 8 is an end view of the axle;

Figure 9 is a partial section through one of the contact stations shown in Figure 7 showing also one form of sealing plug adapted to be used therewith;

Figure 10 is a similar view showing a modification;

Figure 11 is a transverse sectional view through a standard resistor adapted to be used with the contact stations shown in Figures 9 and 10;

Figure 12 is a diagrammatic view showing the manner of applying the standard resistor and current and voltage terminals to the current and voltage contact stations;

Figure 13 is a view similar to Figure 11, showing a modification; and

Figure 14 is a partial elevation showing a modified form of contact station.

Referring now in detail to the drawings and for the present to Figures 1 through 3, I provide a testing apparatus indicated generally at 10, including all the elements of a Kelvin double bridge, except the current source, the suspension galvanometer, and the known resistor to be compared to the member being tested. The apparatus comprises a front panel 11 of insulating material, having metallic angle pieces 12, attached to the edges thereof. Angle brackets 13 and 14 extending rearwardly from the front panel 11 and secured to the angle piece 12 support spaced, parallel panels 15 and 16.

The panel 15 has a pair of standard variable resistors A and C thereon. The resistor A includes a series of contact buttons 17 and a semi-circular segment 19. Similarly, the resistor C includes buttons 18 and a segment 20. The panel 16 has similar resistors B and D thereon. The panels 15 and 16 are disposed back to back, the side on which the buttons and segments are exposed being considered the front of the panel, regardless of its relation to the front panel 11 of the apparatus as a whole. It will be apparent that each of the panels 15 and 16 supports a pair of standard variable resistors in co-planar relation and on opposite sides of a central transverse plane. A shaft 21, journaled in the panels 11, 15, and 16, is provided with arms 22 of insulating material rotatable therewith. A knob 23 upon the shaft permits manual adjustment of the arms 22, and has a pointer 23a cooperating with a graduated scale. As shown in Figure 3, the arms 22 are parallel to each other and the series of buttons 17 and 18 on the spaced panels 15 and 16 are in alignment. Thus, the position of both rotatable arms relative to the contact buttons and the semi-circular segments 19 and 20 is the same. It will be apparent, however, that the contact buttons and semi-circular segments of one of the panels could be displaced angularly relative to those of the other, if the associated rotatable arm were similarly displaced angularly relative to the other arm.

The arms 22 have longitudinal recesses 24 formed therein adjacent each end, the recesses being generally of channel shape in cross section, as indicated in Figure 3, to receive and confine brushes 25, bridging the contact buttons and the segments of the standard resistors. Each brush 25 is composed of a plurality of stacked laminations of relatively stiff conducting material clamped by a screw 26 to a pivot 27. The pivot is seated in a button 27' extending through a hole in the arm 22. Leaf springs 28, secured on the arms 22 by screws 29, engage the protruding ends of the buttons 27' and constantly urge the brushes 25 firmly into contact with the buttons 17 and 18 and segments 19 and 20. The pivot 27 makes the brushes self-adjusting for good contact with the buttons and segments.

Coils 31 of resistance wire are mounted on the rear faces of the panels 15 and 16, the ends of each coil being connected to adjacent pairs of the buttons 17 and 18, as indicated in Figure 4. Only a few of the coils are shown, but there are nine for each of the resistors A, B, C, and D. The coils 31 are wound so that their resistance is identical, preferably 1 ohm exactly.

Circuit connections 32 are taken off from the end buttons 17 and 18 of the resistors. These connections are secured to conducting blocks 33, mounted on the panels 15 and 16. Leads 34 and 35 are secured to the blocks connected to the first buttons of resistors B and A, and leads 36 and 37 to the blocks connected to the first buttons of the resistors D and C. It will be understood that the position of the arms 22 determines the number of the resistance coils 31, connected in series between the segments 19 and 20 and the connections 32.

The segments 19 and 20 are bolted through the panels 15 and 16 to laterally projecting straps 39 on the opposite sides thereof. Screws 40 secure the straps to the panels.

Straps 41 and 42, bent to U-shape, are secured to the angle pieces 12 and support a back plate 43. An intermediate plate 44 is supported from the back plate on posts 45. A cylinder or drum 46 is secured to the back plate 43 by through bolts and spacers 47. The cylinder 46 has parallel peripheral ribs 48, grooved to receive slide wires 49 and 50.

A shaft 51 extends through the panel 11 and the intermediate plate 44, being journaled in a bearing 52 thereon and in a similar bearing 52' mounted on the back plate 43. The shaft is provided with a knob 53, whereby it may be manually rotated from in front of the panel 11. A radial arm 54 is secured to the shaft 51 and is provided adjacent its end with a block 55 of insulating material. Contacts in the form of leaf springs 56 and 57 are secured to the block 55 and have sliding contact with the wires 49 and 50.

The ends of the wires 49 and 50 are secured to lugs 58, projecting from straps 59 extending radially from the cylinder 46 between the straps 39. The adjacent straps 39 and 59 are connected together by through bolts 60, having insulating bushings and washers with a spacer 61 of insulating material between the two sets of straps. By this arrangement, good electrical contact is made between each strap 59 and its adjacent strap 39 and the two straps 59 are insulated from each other.

The contacts 56 and 57 are connected to binding posts 62 and 62' on the front of the panel 11 by wire connections extending along the arm 54, flexible spiral straps 63 extending around the shaft 51 and secured to a block 64 of insulating material mounted on the back plate 43. The wire connections between the contacts 56 and 57 and the straps 63 and between block 64 and the binding posts 62 are omitted to avoid excessive complications of the drawings. A disk 65 is mounted on the shaft 51, just behind the panel 11 and is provided with a peripheral scale 66, visible from the front of the panel through an opening 67. The scale shows the location of the radial arm 54.

Each of the slide wires 49 and 50 has a resistance slightly greater than that of one of the coils 31 and the disk 65 is graduated accordingly. Preferably, each slide wire has a resistance of exactly 1.1 ohm, and the scale 66 has 1100 graduations between one extreme position of the arm 54, i. e., in contact with the lower strap 59 and the other extreme position, i. e., when the arm 34 is in contact with the upper strap 59. This is merely for convenience in making adjustments close to even ohm values and sometimes avoids the necessity of resetting the arms 22 to obtain a balance, in the manner to be described later. Leaf springs 68, secured on opposite sides of the arm 54, are adapted to engage a stop pin 69, extending axially from the cylinder 46 to decelerate the arm 54, as it approached its extreme position.

Figure 4 illustrates the wiring diagram of the principal elements of the apparatus, as shown in Figures 1 through 3. In Figure 4, one pair of variable standard resistors has been displaced vertically relative to the other and the same is true of one of the slide wires on the cylinder 46. Both pairs of standard resistors, however, are shown in Figure 4 as viewed from the same point. The segments 19 and 20 are not shown in Figure 4, since they are merely portions of the connections between the buttons 17 and 18 and the slide wires 49 and 50.

Before explaining the complete circuit shown in Figure 5 and the method which I have invented for checking the physical condition of metal working members, or considering the simplified or equivalent circuit shown in Figure 6, it will be desirable to refer to Figures 7 through 14, showing the provisions which I make in the member itself to adapt it for testing, and the construction of the known resistors with which the member is compared.

In Figure 7, I have shown somewhat diagrammatically a member 70, such as a locomotive axle. It will be understood, of course, that the member indicated at 70 is merely illustrative of numerous metal members whose condition may be checked by my invention. At each end of the axle 70, I provide tapped, counterbored holes 71 and 72. These holes constitute permanent current and voltage contact stations. When the member 70 is in service, screw plugs 73, shown in Figure 9, are inserted in the hole 71 to exclude accumulations of dirt and prevent oxidation.

Figure 11 illustrates a form of standard resistor 74, adapted for use with my invention. It comprises a pair of spaced blocks 75 and 76, preferably composed of metal of high conductivity such as copper, having conducting straps 77, sweated into slots in the manner of the ordinary direct-current shunt providing a fixed known resistance, preferably of the same order as that of the member being tested. The straps 77 are preferably composed of material having a zero thermal coefficient of expansion. A stud 78 is formed on the block 75 and is threaded so it can be introduced into one of the tapped holes 71 when the screw plug 73 is removed. When so inserted, the end face 79 of the block 75 engages the bottom 80 of the counterbore surrounding the hole 71.

The blocks 75 and 76 are enclosed within a sleeve 81 of insulating material and are secured therein by a through bolt 82. A terminal 83, projecting from the block 76, provides a connection by a conductor 84 to a current source. Voltage terminals 85 extend through the sleeve 81 into the blocks 75 and 76, respectively.

Figure 12 illustrates the manner of application of the standard resistor 74, to the member under test, e. g., the axle 70. As shown in Figure 12, the standard resistor 74 is threaded into one of the holes 71 at one end of the axle. At the other end in a corresponding location, I position a current terminal 86 which is similar to the block 75, except that it has a current lead 87 connected directly thereto. Voltage terminals 88 and 89, similar to the terminal 86, are threaded into the holes 72 at each end of the member 70.

The form of contact station illustrated in Figure 9 provides a contact surface below the surface of the adjacent portion of the member being tested. This is sometimes undesirable and for that reason, a modified form of contact station, shown in Figure 10, may be employed. According to this modification, a hole 90 in the member to be tested is provided with a plug 91 by pouring molten metal therein or pressing in a preformed plug. The plug has a tapped hole 92 therein normally closed by a headless screw 93. It will be apparent that when a standard resistor 74 or a current or voltage terminal, such as 86 or 88, is screwed into the hole 92, the contacting surface 79 of the standard resistor or terminal will engage the exposed surface 94 of the plug 91, which is flush with the surface of the adjacent portion of the member being tested.

In some cases, neither a recessed contact surface, such as shown in Figure 9, nor a flush contact surface, as shown in Figure 10, is permissible and in such case, I build up a boss 95 on the member, as shown in Figure 14, and form the tapped holes 71 and 72 therein. Where a tapped hole is not permissible, I provide contact stations by polishing definite areas on the member and clamping suitably shaped terminals thereto by any convenient clamping means.

When a standard resistor of the form shown in Figure 11 is used, the current is introduced into the member being tested, partly through the threaded stud 78 and partly through the contact surface 79. Since the block 75 must be of highly conducting material, such as copper, which does not have a very high resistance to wear, the distribution of the current over the contacting surfaces of the standard resistor and the member under test may vary because of wear of the threads. Any change in the distribution of the current at the point of introduction into the member under test would affect the results obtained from the resistance measurement.

In order to avoid such variations in the distribution of current over the contacting surfaces of the standard resistor of the member under test, I may employ a modified form of standard resistor, shown at 96 in Figure 13. This resistor is generally similar to that of Figure 11, except that the block 75' is bored to receive a plug 78' with a threaded stud extending therefrom. The plug 78' is composed of steel or other similar hard metal which is not subject to rapid wear and is insulated from the block 75' by suitable bushings. In the modified structure, the through bolt 82 extends through the block 75' and block 78' and is insulated from the former by suitable bushings and washers. The modified form of standard resistor has a current conductor 97, brazed into the block 76' thereof, instead of a terminal such as that illustrated at 83, to which a conductor may be connected.

With the modified construction of standard resistor, the current is introduced only through the annular shoulder of the block 75, which abuts the member being tested and uniform contact over this area is always obtained. The current terminals 86 may be like the block 75' instead of the block 75.

In order to utilize the invention for the purpose described, a test set-up is made as illustrated in Figure 5. The standard resistor 74 is screwed into one end of the axle 70, and the current terminal 86 is screwed into the other end. These terminals are connected in a circuit including a current source such as a battery 98 and a rheostat 99. The battery is of sufficient capacity to deliver a substantial current through the standard resistor and axle, e. g., 200 or 300 amperes. It will be apparent that the current through the axle is concentrated near the contact stations adjacent the ends of the axle, but is distributed substantially uniformly over the cross sectional area of the axle toward the mid-portion thereof.

The distribution of the current flowing through the axle is indicated roughly by dotted flow lines 100 in Figure 12. An important feature of the invention is the location of the voltage contact stations 72 at a distance from the current contact stations 71 sufficient to avoid errors which would otherwise be introduced by the concentration of current adjacent the latter. This concentration, as shown by tests, indicates an apparent resistance of the member which is higher than the actual resistance and therefore impairs the significance of the results.

The leads 34 through 37 from the variable standard resistors are connected as illustrated in Figure 5, the leads 34 and 35 being connected to the voltage terminals 85 and 85' of the known resistor 74, and the leads 36 and 37 being connected to the voltage terminals 89 and 88, respectively.

A galvanometer 101, connected across the slide wires 49 and 50, complete a Kelvin double-bridge circuit whereby the resistance of the axle 70 may be accurately determined by comparison with the known resistor 74. For convenience in making preliminary adjustments, I provide a simple jewel-bearing galvanometer 101a, mounted on the panel 11. For accurate final observation, I provide a suspension type galvanometer (not shown) in a portable case separate from the apparatus shown in Figures 1 through 3, and provided with leads adapted to be secured to the binding posts 62 and 62'. A change-over switch 102 shifts the connections from the slide wires 49 and 50 from one galvanometer to the other.

Referring to Figure 6, the portion of the circuit conductor designated X represents the resistance of the axle 70. The portion of the circuit conductor designated S represents the resistance of the standard resistor 74. The portions of circuit conductors designated A, B, C, and D represent the effective portions of the resistance of the standard resistors mounted on the panels 15 and 16. The slide wires 49 and 50 are not illustrated in Figure 6, because they constitute merely an addition to the effective resistance of the standard resistors A, B, C, and D, for the purpose of obtaining an exact balance.

Referring back to Figures 1 through 4, it will be observed that by reason of the connection of leads 35 and 37 to the adjacent ends of the standard resistors A and C, rotation of the shaft 21 in one direction will increase the effective resistance of one resistor and decrease that of the other in exactly the same proportion. The same, of course, is true of the other pair of resistors.

As shown in Figure 4, rotation of the contacts 56 and 57 shifts a portion of the resistance of the slide wires 49 and 50 from the resistor A to the resistor C or from the resistor B to the resistor D or vice versa. For this reason in Figure 5, the connections between the moving contacts associated with the resistors A and C and B and D may be considered the slide wires 49 and 50, and rotation of the knob 53 may be considered to effect identical movements of the pointers engaging the wires 49 and 50 in Figure 5, along the latter.

It will thus be apparent that rotation of the knob 23 effects a coarse adjustment of the effective resistance of the resistors A, B, C, and D, the resistance of the resistors A and B being increased in exactly the same proportion as the resistance of the resistors C and D is decreased and vice versa, and that the rotation of the knob 53 effects a fine adjustment by adding to the resistance of the resistors A and B and subtracting from the resistance of the resistors D and C and vice versa. These adjustments may be readily understood from the simplified or equivalent circuit of Figure 6, by assuming that the contact points connected to the galvanometer 101 move up and down along the resistors A and C and B and D by equal increments. Figure 6 thus illustrates that the circuit of Figure 5 constitutes precisely a Kelvin double bridge in which two variable resistance arms (AC and BD) are connected across the known and unknown resistances. According to the principle of the Kelvin double bridge, when a condition of balance is achieved (indicated by zero deflection of the galvanometer), by adjusting the ratios A/C and B/D, these ratios are equal to that between the known and unknown resistances, or $$\frac{X}{S}=\frac{C}{A}=\frac{D}{B}$$

from which X may readily be calculated, since $$X=\frac{C}{A}(S)$$

S being a fixed known resistance and C and A being readable from the position of the arms 22 and the contact fingers 56 and 57.

The total resistance of the arms AC and BD is always the same, i. e., 10.1 ohms. The resistance of resistor C, for any balanced condition, is composed of the number of coils 31, connected in series, which is read from the scale with which pointer 23a cooperates, and the portion of the slide wire 50 in series which is read from scale 66. The sum of the two readings, or the value of C, gives the value of A since $A=10.1-C$.

The apparatus described makes it possible to measure the resistance of members such as 70 with extreme accuracy. The scale 66, because of its considerable length, may be read to four significant figures and the fifth figure estimated. The resistance of the known resistor may be very small, e. g., 5 microhms, and the resistance of the member under test may thus be determined directly within $10^{-10}$ ohms.

It will be apparent that a partial or incipient fracture in a working member, such as the axle 70, will reduce the sectional area available for the passage of an electric current, or in other words, increase its electrical resistance. The occurrence or growth of such fracture between successive measurements of the resistance of the member by the method and apparatus described hereinabove may be readily noted. Such a change in the resistance of the working member results not only from a partial or incipient fracture, but from the development of permanent fatigue or a combination of these and other conditions. The change in resistance becomes more pronounced, furthermore, as the defective condition progresses. It is thus possible by my invention to measure the resistance of working members at predetermined intervals with such accuracy and freedom from error as to obtain significant indications of the need for replacement of the member when the defective condition becomes seriously hazardous.

The required high degree of accuracy in the measurement of the resistance of the working member results from utilization of permanent contact stations, whereby the distribution of current through the member is the same at every test, from the location of the voltage contact stations a sufficient distance from the current contact stations to avoid errors introduced by the concentration of current adjacent the latter and the use of large leads and heavy contact pressures to eliminate errors in the apparatus itself. Such provisions, in conjunction with the use of the Kelvin double bridge, which is known to be one of the most accurate resistance-measurement devices, renders it safe to rely on the results obtained by my method in determining when a working member should be removed from service.

Certain types of members which are susceptible of checking by my invention, are subjected during their useful life to wear of such character that their sectional area is reduced. Locomotive crank pins, for example, suffer a reduction in diameter by wear and are turned down at intervals and fitted with new bearings. This obviously involves a change in the resistance of the crank pin. In order to obtain the benefits of the invention, I make an allowance for wear or turning down of a crank pin, for example, in order to avoid a false indication of the condition of the member interiorly. In the case of a crank pin, the turning down operation effects an increase in resistance proportional to the decrease in the sectional area and since this may readily be determined, the proper allowance therefor may be easily made.

It will be apparent that the invention is based on the principle that when current is introduced into a member under test and withdrawn therefrom at precisely the same points, the path and distribution of the current within the member are the same until structural changes occur in the body of the metal. By reason of the portability of the apparatus which I have invented and the simplicity of the operations involved, it is feasible to include the testing of working members according to the method of my invention in the ordinary routine inspection of such members, without much increase in cost or time. The invention is particularly advantageous in that it may be applied to working members without removing them from service. The crank pins, connecting rods, side rods, etc., of locomotives may be tested in place and without insulating such members from the remainder of the apparatus with which they are associated. It may also be utilized to test members before assembly. In fact, it is usually preferable to do this in order to obtain a base line or zero point for comparison with subsequent tests. The only apparatus necessary in addition to that illustrated in Figures 1 to 3 and the suspension galvanometer, which is a standard article, is a small, low-voltage, high-current battery.

Variations in the resistance of the members being tested, due to temperature changes, may be compensated for by reducing all resistance measurements to a standard temperature. As an alternative, the resistance straps 77 may be of the same composition as the member being tested, so that the known resistor is affected by temperature changes to precisely the same extent as the member being tested. It will be understood that the resistor when attached to the member, as shown in Figure 12, will attain the temperature of the member in a relatively short time.

As a specific example of the utility of the invention, I have found that a relatively small increase in the resistance of a working member over the value obtained at previous inspection is sufficient justification for condemnation and replacement of the member under test. This has been borne out by further tests on members showing changes of resistance of the magnitude indicated, as by cutting sections through a condemned member and etching the surfaces of the sections.

Although I have illustrated and described a preferred embodiment and practice of the invention with certain modifications, it will be understood that changes may be made in the construction and manipulation thereof, without departing from the spirit of the invention or the scope of the appended claims.

I claim:

1. The method of preparing for testing a metallic working member that is subjected to varying stresses during operation, as a step in the process described, which consists in establishing two electrical contact-engaging areas at such locations on the working member that an electric current between those areas will traverse a zone most likely to be affected by the imposed or developed working stresses, locating such areas within the external contour of the member as imposed by the character of the service in which said member is to be used, and normally covering such areas for protection and to complete the contour of said member; and in establishing a pair of contact points to permit the drop of potential to be measured across said current-traversed path.

2. A metallic member for use to transmit or sustain mechanical stresses in its intended operation, consisting of a metallic body, provided with a pair of testing stations on opposite sides of a zone in said member most likely to be affected by said stresses, said station consisting first of a relatively plane surface on or adjacent the normal external contour surface of said member, and, second, of a threaded recess for the reception of a threaded plug to establish positive electrical contact between said plane surface and an external current-transmitting element.

3. The method of preparing for testing a metallic working member that is subjected to varying stresses during operation, as a step in the process described, which consists in establishing two electrical contact-engaging areas at such locations on the working member that an electric current between those areas will traverse a zone most likely to be affected by the imposed or developed working stresses, locating such areas on, and flush with a contour surface of the member as imposed by the character of the service in which said member is to be used; and in establishing a similar pair of contact areas to permit the drop of potential to be measured across said current-traversed path.

4. A metallic member for use to transmit or sustain mechanical stresses in its intended operation, consisting of a metallic body provided with a pair of testing stations on opposite sides of a zone in said member most likely to be affected by said stresses, one of said stations in each pair consisting, first, of a relatively plane surface on, and flush with, the external contour surface of said member, and second, of means for guiding the application of an external contact element to establish positive electrical contact between said plane surface and said external element, for current transmission therebetween.

5. A metallic member for use to transmit or sustain mechanical stresses in its intended operation, consisting of a metallic body, provided with a pair of testing stations on opposite sides of a zone in said member most likely to be affected by said stresses, said station consisting, first, of a relatively plane surface projecting beyond the normal external contour surface of said member, and second, of means to establish positive electrical contact between said plane surface and an external current-transmitting element.

6. Apparatus for checking the condition of a metal member including a current contact station on said member and a shunt adapted to be secured to the member at said station, the resistive portion of the shunt being metal of substantially the same composition as said member.

7. In a method of detecting progressive fractures in a metal member subjected to heavy stress in normal service, the steps including connecting the known resistor of a Kelvin double-bridge circuit to a current contact station on said member, connecting a current source to said known resistor and to another permanent current contact station on said member, connecting to said circuit permanent voltage contact stations located on said member at a sufficient distance from said current stations to avoid the effects of high current density adjacent the latter, so that said member constitutes the unknown resistance in said circuit, measuring the resistance of the member, and observing the percentage variation in its resistance after a period of normal service.

8. Means for making possible repeated precision resistance measurements on a metal member whereby to reveal the progress of a fracture therein, said means including a current contact station on said member having a recess and a contact surface bordering said recess, and a shunt having a stud adapted to enter said recess and a shoulder adapted to engage said surface.

9. Means for making possible repeated precision resistance measurements on a metal member, whereby to reveal the progress of a fracture therein, said means including a current contact station on said member having a tapped hole, a contact surface bordering the hole, and a shunt having a threaded stud adapted to be received in said hole and a shoulder adapted to abut said surface when said stud is screwed home in said hole.

10. Means for making possible repeated precision resistance measurements on a metal member, whereby to reveal the progress of a fracture therein, said means including a pair of permanent current contact stations so located as to cause a substantial portion of the member to be traversed by electric current when said stations are connected to a current source, and a pair of permanent voltage contact stations on said member, said voltage contact stations being spaced sufficiently from said current contact stations to avoid the effect of current concentration adjacent the latter upon a measurement of resistance involving the drop in voltage between said voltage contact stations.

11. In a system of the character described, the method of setting up a close, low-resistance coupling between a member to be tested and a standard resistor, which consists in providing a threaded recess in the element to be tested, providing a threaded plug on and insulated from the standard resistor with dimensions closely approximating the dimensions of the recess, and then inserting the threaded plug tightly into the threaded recess of the member to be tested, to establish contact between the member and standard, independently of the contact between the plug and the recess.

GROVER R. GREENSLADE.